United States Patent
Akiyama et al.

(10) Patent No.: US 8,010,754 B2
(45) Date of Patent: *Aug. 30, 2011

(54) MEMORY MICRO-TILING

(75) Inventors: James Akiyama, Beaverton, OR (US);
Randy B. Osborne, Beaverton, OR (US); William H. Clifford, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/690,551

(22) Filed: Jan. 20, 2010

(65) Prior Publication Data

US 2010/0122046 A1    May 13, 2010

Related U.S. Application Data

(63) Continuation of application No. 11/159,745, filed on Jun. 23, 2005.

(51) Int. Cl.
*G06F 12/00* (2006.01)

(52) U.S. Cl. ............... 711/154; 711/E12.078; 711/104; 711/105

(58) Field of Classification Search .................. None
See application file for complete search history.

(56) References Cited

U.S. PATENT DOCUMENTS

| | | | |
|---|---|---|---|
| 3,988,717 A | 10/1976 | Kisylia | |
| 4,051,461 A | 9/1977 | Hashimoto et al. | |
| 4,059,850 A | 11/1977 | Van Eck et al. | |
| 4,124,891 A | 11/1978 | Weller, III et al. | |
| 4,495,570 A | 1/1985 | Kitajima et al. | |
| 4,504,902 A | 3/1985 | Gallaher et al. | |
| 5,251,310 A * | 10/1993 | Smelser et al. | 711/144 |
| 5,325,510 A | 6/1994 | Frazier | |
| 5,412,662 A | 5/1995 | Honma et al. | |
| 5,459,842 A | 10/1995 | Begun et al. | |
| 5,526,507 A | 6/1996 | Hill | |
| 5,649,157 A | 7/1997 | Williams | |
| 5,748,554 A | 5/1998 | Barth et al. | |
| 5,752,045 A * | 5/1998 | Chen | 713/322 |
| 5,761,708 A | 6/1998 | Cherabuddi et al. | |
| 5,790,118 A | 8/1998 | Bertram | |
| 5,901,332 A | 5/1999 | Gephardt et al. | |
| 5,905,725 A | 5/1999 | Sindhu et al. | |
| 5,913,231 A | 6/1999 | Lewis et al. | |

(Continued)

FOREIGN PATENT DOCUMENTS

DE    3689276 T2    8/1993

(Continued)

OTHER PUBLICATIONS

Webopedia, ("Main Memory"), Jan. 15, 2002, pp. 1-3, http://www.webopedia.com/TERM/M/main_memory.html.*

(Continued)

*Primary Examiner* — Shane M Thomas
*Assistant Examiner* — Christopher D Birkhimer
(74) *Attorney, Agent, or Firm* — Blakely, Sokoloff, Taylor & Zafman LLP

(57) ABSTRACT

According to one embodiment, a memory controller is disclosed. The memory controller includes assignment logic and a transaction assembler. The assignment logic receives a request to access a memory channel. The transaction assembler combines the request into one or more additional requests to access two or more independently addressable subchannels within the channel.

16 Claims, 10 Drawing Sheets

U.S. PATENT DOCUMENTS

| | | | |
|---|---|---|---|
| 6,061,773 | A | 5/2000 | Harvey et al. |
| 6,076,139 | A | 6/2000 | Welker et al. |
| 6,108,725 | A | 8/2000 | Chatter |
| 6,122,709 | A | 9/2000 | Wicki et al. |
| 6,145,065 | A | 11/2000 | Takahashi et al. |
| 6,151,641 | A | 11/2000 | Herbert |
| 6,249,851 | B1 * | 6/2001 | Richardson et al. .......... 711/167 |
| 6,389,488 | B1 | 5/2002 | Strongin et al. |
| 6,430,672 | B1 | 8/2002 | Dhong et al. |
| 6,438,675 | B1 | 8/2002 | Root et al. |
| 6,453,380 | B1 | 9/2002 | Van Lunteren |
| 6,606,688 | B1 | 8/2003 | Koyanagi et al. |
| 6,643,746 | B1 | 11/2003 | Bouquet |
| 6,651,151 | B2 | 11/2003 | Palanca et al. |
| 6,708,248 | B1 | 3/2004 | Garrett, Jr. et al. |
| 6,745,272 | B2 * | 6/2004 | Owen et al. ................... 710/107 |
| 6,820,181 | B2 | 11/2004 | Jeddeloh |
| 6,851,030 | B2 | 2/2005 | Tremaine |
| 6,862,672 | B1 | 3/2005 | Furudate et al. |
| 7,006,505 | B1 | 2/2006 | Bleszynski et al. |
| 7,043,617 | B2 | 5/2006 | Wiliams |
| 7,130,229 | B2 | 10/2006 | Dahlen et al. |
| 3,323,109 | A1 | 5/2007 | Hecht et al. |
| 2002/0078268 | A1 | 6/2002 | Lasserre |
| 2002/0188858 | A1 | 12/2002 | Oerlemans |
| 2003/0056058 | A1 | 3/2003 | Veitch |
| 2003/0142102 | A1 | 7/2003 | Emberling |
| 2003/0179598 | A1 | 9/2003 | Chen |
| 2003/0191915 | A1 * | 10/2003 | Saxena et al. ................. 711/160 |
| 2003/0204679 | A1 | 10/2003 | Blankenship |
| 2003/0225970 | A1 | 12/2003 | Hashemi |
| 2003/0229821 | A1 | 12/2003 | Ma |
| 2004/0044857 | A1 | 3/2004 | Jeddeloh |
| 2004/0078532 | A1 | 4/2004 | Tremaine |
| 2004/0142102 | A1 | 7/2004 | Banerjee et al. |
| 2004/0193829 | A1 * | 9/2004 | Woo et al. ..................... 711/170 |
| 2005/0068844 | A1 | 3/2005 | Roohparvar |
| 2005/0080953 | A1 | 4/2005 | Oner et al. |
| 2005/0193293 | A1 | 9/2005 | Shikata |
| 2006/0294264 | A1 | 12/2006 | Akiyama et al. |
| 2006/0294325 | A1 | 12/2006 | Akiyama et al. |
| 2006/0294328 | A1 | 12/2006 | Akiyama et al. |

FOREIGN PATENT DOCUMENTS

| | | |
|---|---|---|
| DE | 10216611 A1 | 11/2003 |
| EP | 1001347 | 5/2000 |
| JP | 02067622 | 3/1990 |

OTHER PUBLICATIONS

Abdo Sharif, ("Cache Memory"), Oct. 26, 2004, pp. 1-3, http://searchstorage.techtarget.com/sDefinition/0,,sid5_gci211730,33.html.*

PCT International Search Report for PCT/US2006/025460, mailed Jul. 2 2007, 5 pgs.

PCT Written Opinion for PCT/US2006/025460, mailed Jul. 2, 2007, 6.

"IA-32 Intel Architecture Software Developer's Manual", vol. 3: *System Programming Guide*, 9-1-9-3.

Srikanth, "Cache Memory", http://web.archive.org/web/20000713053339/http://www.newton.dep.anl.gov/askasci/com..., (Jun. 19, 2009), 2 pages.

WEBOPEDIA, ""Main Memory"", http//www.webopedia.com/TERM/m/main_memory.html, (Jan. 15, 2002), 1-4.

POWERVR, "POWERVR MBX Technology Overview", *1.5f (POWERVR SDK 2.05.25.0295)*, (May 6, 2009), 1-17.

* cited by examiner

| A-2N | A-N | A+0 | A+N | A+2N | A+3N | A+4N | A+5N | A+6N | A+7N | A+8N | A+9N | A+10N | A+11N | A+12N | A+13N |
|---|---|---|---|---|---|---|---|---|---|---|---|---|---|---|---|
| 0 | 1 | | | 0 | 1 | | | 0 | 1 | | | 0 | 1 | | 3 |

FIG. 6

| A-2N | A-N | A+2N | A+3N |
|---|---|---|---|
| 0 | 1 | 0 | 1 |
| A+0 | A+N | A+4N | A+5N |
| A+6N | A+7N | A+10N | A+11N |
| 0 | 1 | 0 | 1 |
| A+8N | A+9N | A+12N | A+13N |
| | | | 3 |

MEMORY MICRO-TILING

PRIORITY

This application is a continuation of application Ser. No. 11/159,745, file Jun. 23, 2005, entitled Memory Micro-Tilling, and claims priority therefrom.

FIELD OF THE INVENTION

The present invention relates to computer systems; more particularly, the present invention relates to accessing memory control.

BACKGROUND

Computer systems implementing Unified Memory Architecture (UMA) feature a graphics controller that accesses main memory for video memory. However, the memory efficiency of UMA graphics systems may be limited due to CPU cache line size requirements. For example, the ideal memory access size for graphics may be 4 to 16 bytes, since graphics controllers can operate on one or a few pixels or texels at a time. Nevertheless, memory architectures are often optimized for the 64 byte CPU cache line size to optimize CPU memory efficiency. The result is that, on average, a significant amount of data read from memory may never used by the graphics controller.

Manufacturers of discrete graphics controllers minimize this over fetch by using narrower memory channels. This solution, however, is not available for UMA-based integrated graphics controllers.

BRIEF DESCRIPTION OF THE DRAWINGS

The invention is illustrated by way of example and not limitation in the figures of the accompanying drawings, in which like references indicate similar elements, and in which:

FIG. 6 illustrates one embodiment of identity subchannel assignment;

FIG. 7 illustrates another embodiment of identity subchannel assignment;

FIG. 8 illustrates yet another embodiment of identity subchannel assignment;

FIG. 10 illustrates one embodiment of non-identity subchannel assignment; and

DETAILED DESCRIPTION

A mechanism for memory request combination is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
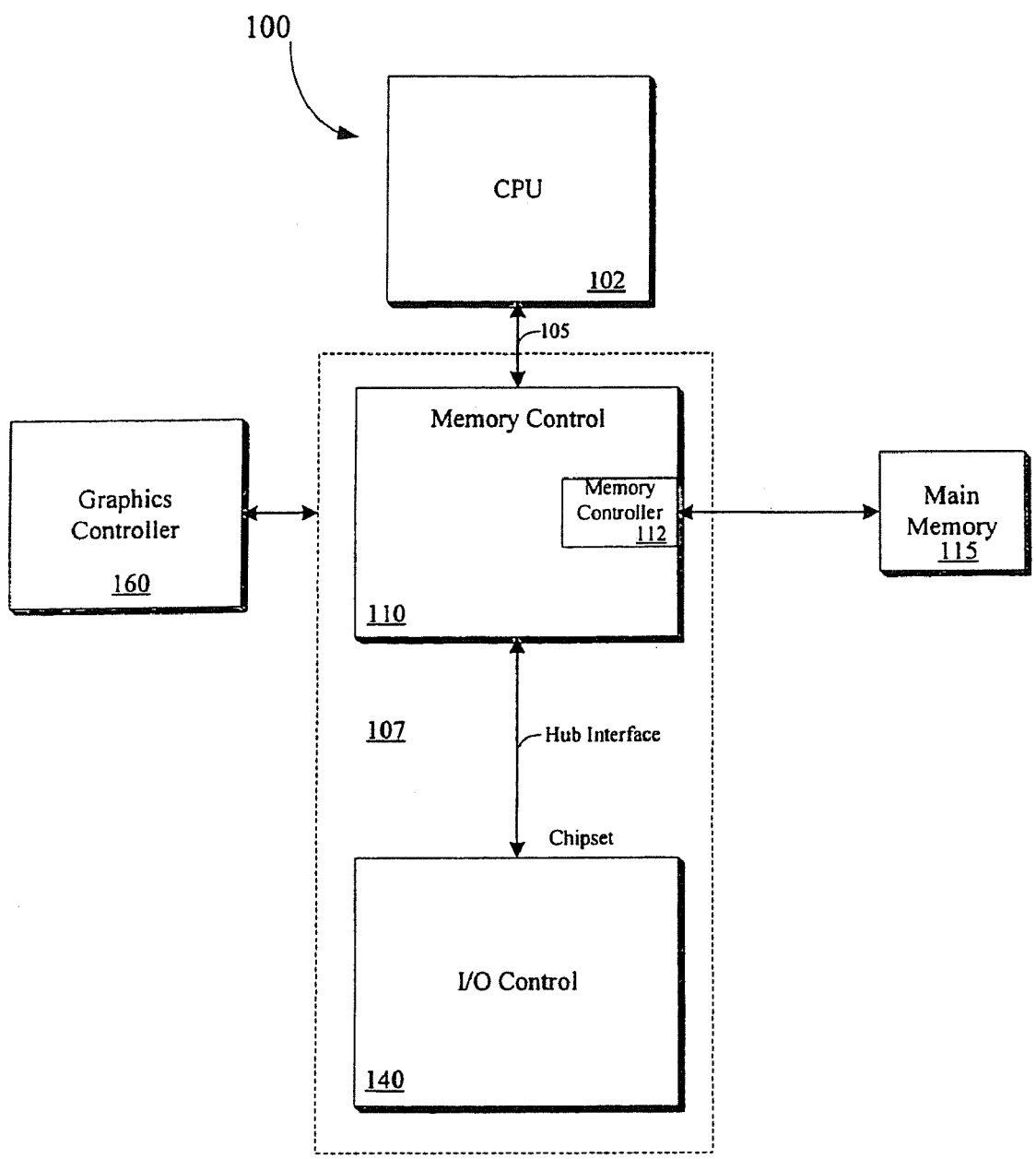
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of Pentium® IV processors available from Intel Corporation of Santa Clara, Calif. Alternatively, other CPUs may be used. For instance, CPU 102 may be implemented using multiple processing cores. In yet other embodiments, computer system 100 may include multiple CPUs 102

In a further embodiment, a chipset 107 is also coupled to interface 105. Chipset 107 includes a memory control component 110. Memory control component 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

Memory control component 110 may be coupled to an input/output (I/O) control component 140 via an interface. I/O control component 140 provides an interface to I/O devices within computer system 100. I/O control component 140 may support standard I/O operations on I/O busses such as peripheral component interconnect (PCI) Express, accelerated graphics port (AGP), universal serial bus (USB), low pin count (LPC) bus, or any other kind of I/O bus (not shown).

According to one embodiment, graphics controller 160 is in communication with chipset 107 and is implemented to provide video graphics to a display monitor (not shown) coupled to computer system 100. Graphics controller 160 accesses main memory 115 for video memory. As discussed above, the memory efficiency of memory device supporting both a graphics system and a CPU is limited since memory access size for graphics is often ideally 4 to 16 bytes, while memory architectures are optimized for the 64 byte CPU line size to optimize CPU memory efficiency.

Micro-Tiling

According to one embodiment, memory control component 110 features Micro-Tiling in order to reduce memory request size for graphics devices, while maintaining 64 byte memory transactions. A standard memory channel, such as based on DDR DRAM technology, has some physical width of m bits. A memory transaction includes T transfers for a total logical width of M=m*T/8 bytes. The bytes within each transaction are considered to have consecutive addresses. In subsequent discussion, the term width means the logical width.

Micro-Tiling breaks the M byte wide channel into S subchannels that are each N=M/S bytes wide and where N bytes of data are transferred on each subchannel. An address may be presented to each subchannel, in which some number, I, of independent address bits may be different from corresponding bits in the addresses presented to the other subchannels. The data transferred on each subchannel may be considered to represent a contiguous address range. However, the blocks of data on each subchannel are not necessarily from a contiguous address range. Each subchannel includes a subset of the total memory locations of the channel.

Figure 2:
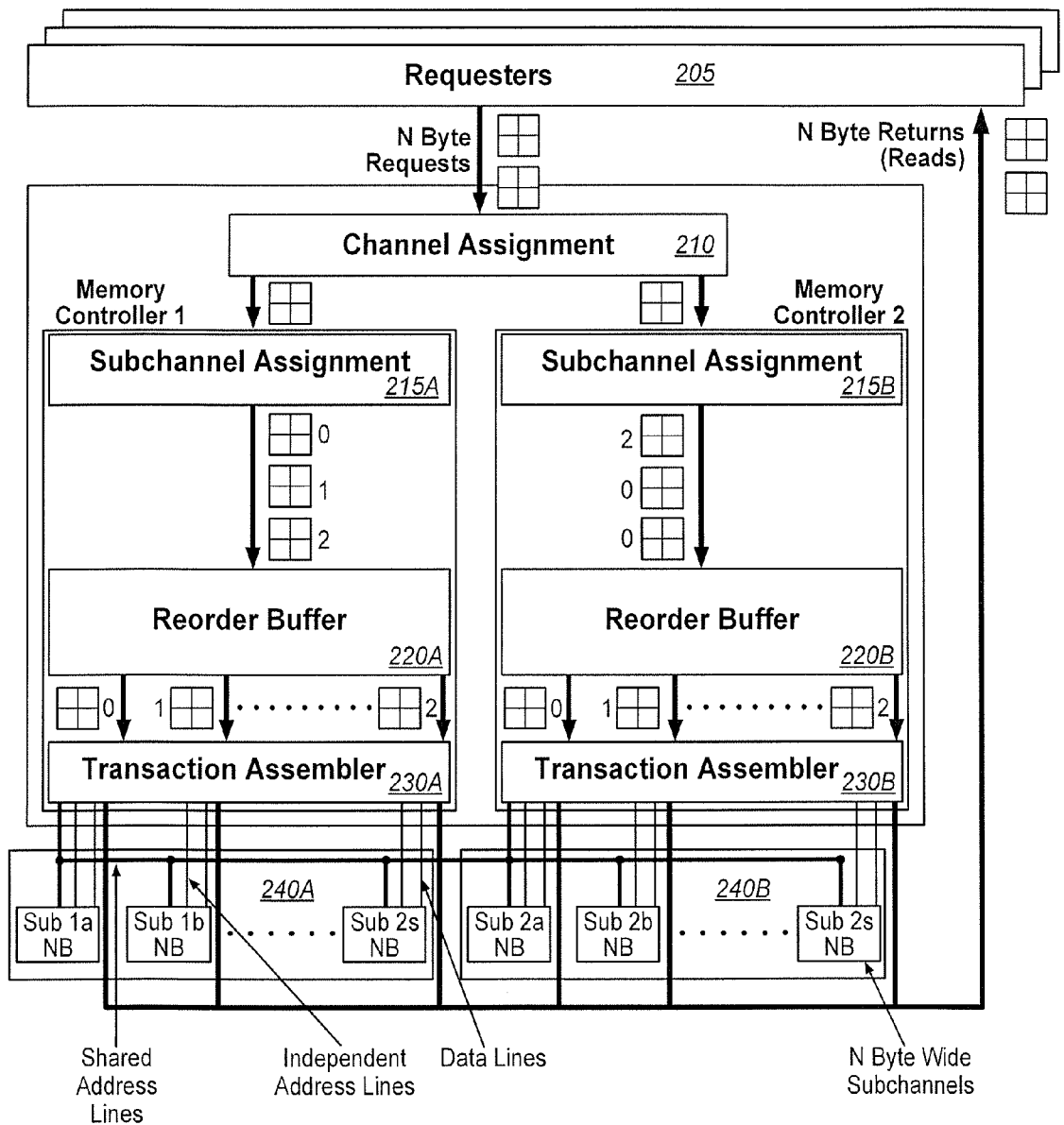
FIG. 2 illustrates one embodiment of a memory controller.

FIG. 2 illustrates one embodiment of an memory control component 110 supporting Micro-Tiling. In one embodiment, a multi-channel memory subsystem has a Micro-Tiling memory controller per channel. Thus, as illustrated in FIG. 2, memory control component 110 includes two memory controllers 112 (memory controllers 1 and 2), one for each of the two channels. Each channel includes S subchannels, each N bytes wide. Thus each channel may be M=N*S bytes wide.

In this figure, requests to read or write memory are depicted as 2×2 arrays of squares possibly representing a 2×2 array of pixels or texels. Requests are shown before being assigned to a subchannel. After subchannel assignment, requests are numbered 0-S-1 to suggest subchannel assignment. The N byte returns to requester 205 coupled to memory control component 110 occur in the case of a read transaction.

Memory control component 110 includes channel assignment logic 210 coupled to memory controllers 112. Channel assignment 210 assigns each request received from requester 205 to a memory channel 240 via a memory controller 112. Further, each memory controller 112 includes subchannel assignment 215, reorder buffer 220 and transaction assembler 230. Thus, requests are assigned to memory controller 1 or memory controller 2 shown in FIG. 2.

Subchannel assignment 215 assigns each request to a subchannel within a memory channel 240. Reorder buffer 220 collects requests to enable transaction assembler 230 to attempt to assemble memory accesses for each memory 240 subchannel. According to one embodiment, each subchannel has an equal N byte width.

During operation of the system shown in FIG. 2, a request to read or write a block of N bytes of data at address A enters a memory controller (1 or 2) may be assigned to a subchannel and may be placed in a reorder buffer 220. In one embodiment, the Identity Subchannel Assignment, s, may be defined by the following process: the request address, A, is shifted right by $P=\log_2(N)$ bits, resulting in a new integer value $\tilde{A}$ (e.g., $\tilde{A}=A>>P$); and s is the least significant $Q=\log_2(S)$ bits of $\tilde{A}$ (e.g., $s=\tilde{A}\ \&\ ((1<<Q)-1)$).

The memory controller forms a memory read transaction by selecting S read requests, one for each subchannel, from the reorder buffer 220. The memory controller forms a memory write transaction by selecting S write requests, one for each subchannel, from reorder buffer 220. The portion of the address represented by shared address lines may be the same for all subchannel requests in the transaction.

Figure 3:
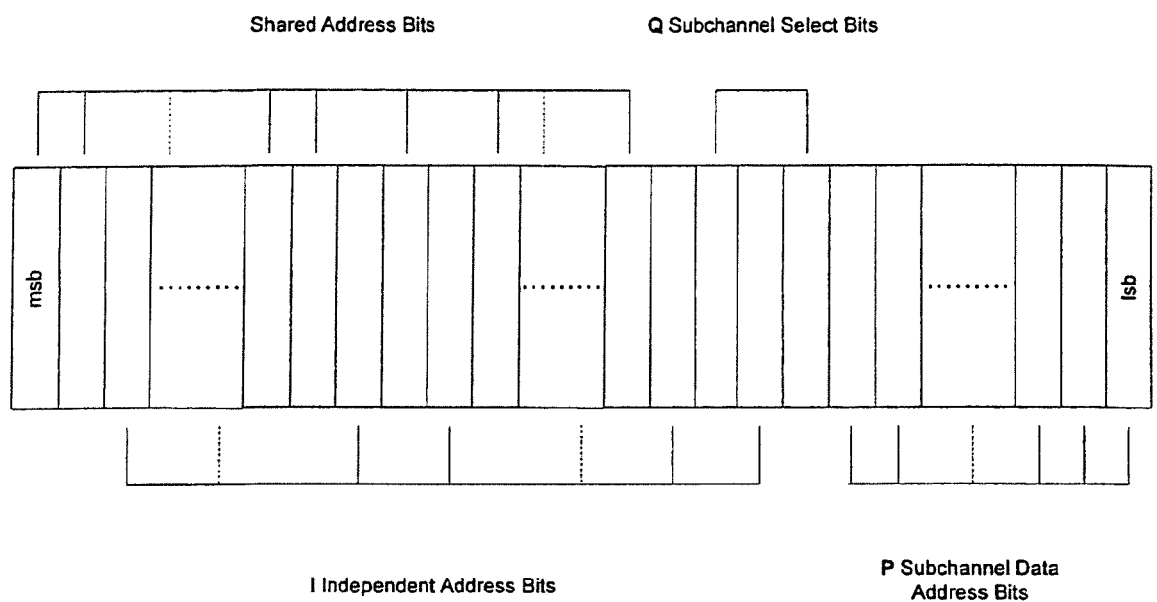
FIG. 3 illustrates one embodiment of a logical virtual address.

FIG. 3 illustrates one embodiment of an interpretation of address bits in a physical address. The choice of shared and independent address bits, and subchannel select bits shown in FIG. 3 is for illustrative purposes since the division of the address bits above the P subchannel data address bits into shared and independent address bits, and subchannel select bits may be arbitrary. The independent address bits are different across subchannels, and are not necessarily contiguous. The address bits sent to a subchannel are the shared address bits and the independent address bits of that subchannel.

Figure 4:
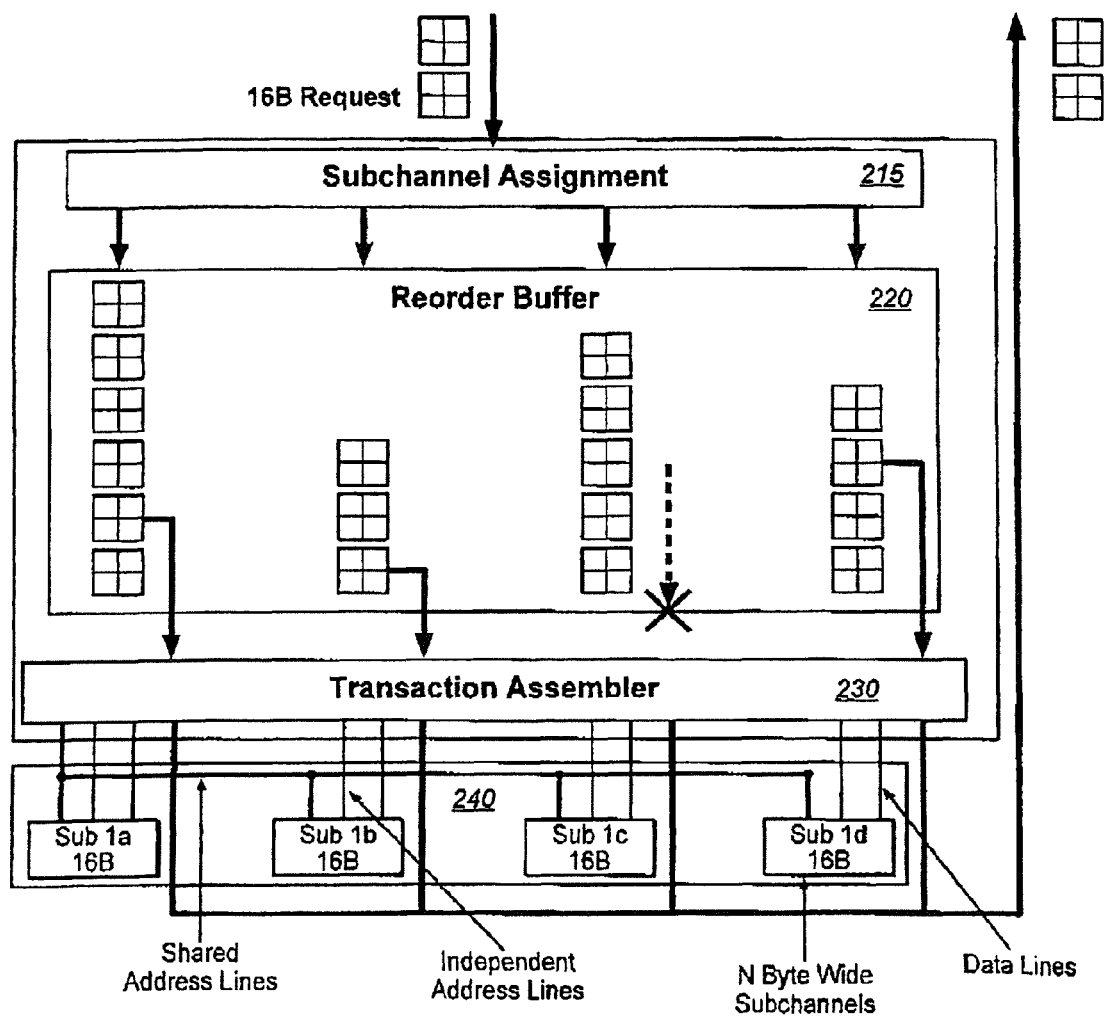
FIG. 4 illustrates another embodiment of a memory controller.

FIG. 4 illustrates an embodiment of memory control component 110 assembling a 64 byte transaction from four 16 byte requests with only a single transaction being shown. FIG. 4 shows reorder buffer 220 implemented as a reorder queue for each subchannel. However, in other embodiments, reorder buffer 220 may be implemented via other mechanisms.

In this embodiment, transaction assembler 230 constructs a 64 B memory request from 16B requests, one for each subchannel. All 16 byte requests forming the memory request have the same shared address bits. Thus assembler 230 looks into the queue for requests that can be assembled into a single transaction based upon whether requests have a common shared address.

Note that in the embodiment shown in FIG. 4, assembler 230 cannot find a request for subchannel 1c. When attempting to form a transaction, the memory controller may not be able to find a request for each subchannel such that all have the same shared address segment (e.g., such that the value of each shared address bit may be the same across all requests).

If a subchannel cannot be filled by a request in the corresponding queue, the effect is that no transfer may be performed from/to that subchannel. In one embodiment, if a subchannel cannot be filled by a request, an arbitrary location may be read and the results are discarded. In an alternative embodiment, an additional control line may be included per subchannel, which may be used to power down a subchannel when there is no corresponding request to that channel.

The Micro-Tiling memory subchannels can access discontiguous memory addresses within some address ranges determined by the shared address bits and the I independent address bits. A judicious choice of I can provide the increased concurrency and bandwidth efficiency of independent subchannels, balanced against the cost of duplicating I address signals to each subchannel.

Figure 5A:
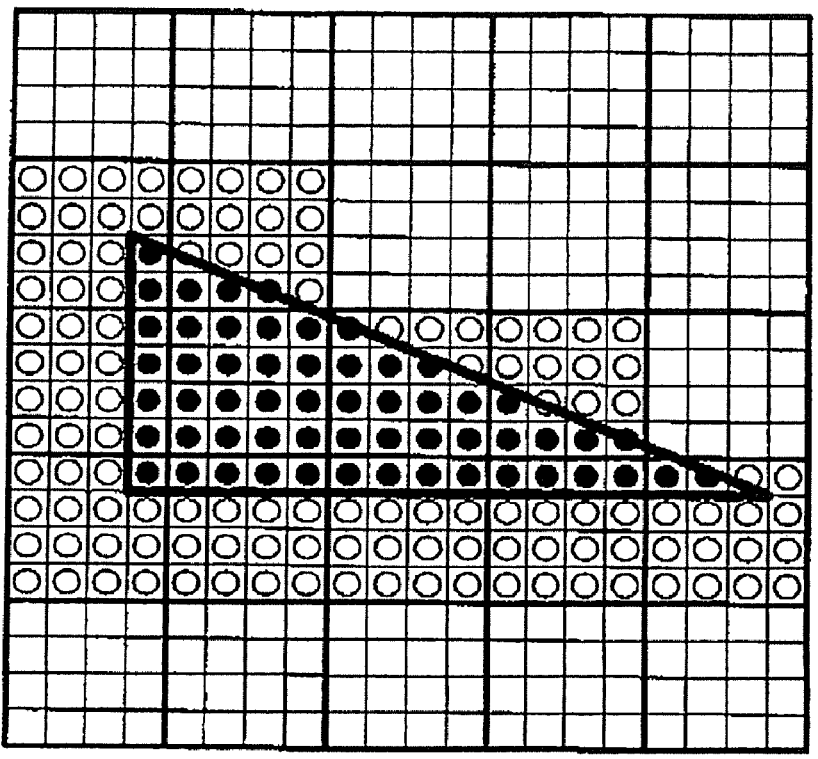
FIGS. 5A & 5B illustrate performance benefits.
Figure 5B:
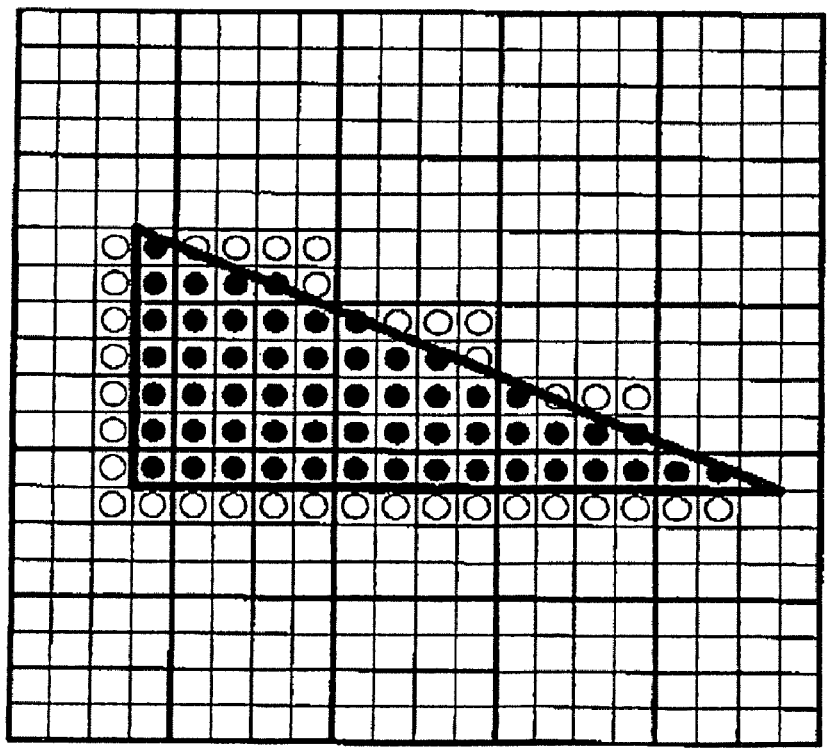

FIGS. 5A & 5B illustrate performance benefits for Micro-Tiling. Each figure shows the rasterization of a triangle in a tiled address space, with each small square representing a 4 byte pixel or texel. FIG. 5A shows overfetch in a standard memory system when requests are 64 bytes each. Each 4×4 block of pixels represents a 64 byte aligned block of memory. The triangle encompasses 57 pixels. With a standard memory subsystem, those 57 pixels are in 11 (64 byte) blocks of memory. Thus, in order to access those 57 pixels, an additional 119 pixels worth of data may be accessed that may not be used (e.g., resulting in 32% efficiency).

FIG. 5B shows the over fetch if requests are 16 bytes each and if all such requests can be utilized by the Micro-Tile Assembler to build 64 byte memory transactions with no unused subchannels. In this case, the triangle touches 23 2×2 pixel arrays, resulting in 35 additional pixels worth of data being accessed (e.g., resulting in 62% efficiency). The effectiveness of Micro-Tiling depends on the ability of the Assembler to construct fully populated memory transactions.

Micro-Tiling Request Mapping

As discussed above, the Identity Subchannel Assignment, s, may be defined by: the request address, A, is shifted right by $P=\log_2(N)$ bits, resulting in a new integer value $\tilde{A}$ (e.g., $\tilde{A}=A>>P$); and s is the least significant $Q=\log_2(S)$ bits of $\tilde{A}$ (e.g., $s=\tilde{A}\ \&\ ((1<<Q)-1)$). FIG. 6 illustrates one embodiment of identity subchannel assignment for the case of a linear address space. In this embodiment, a channel may be composed of four subchannels (S=4).

FIG. 6 shows the subchannel assignment of a portion of linear address space, relative to some address A, in which each small block represents N bytes. A block 0 represents an address range that will be assigned to subchannel 0, block 1 represents an address range that will be assigned to subchannel 1, block 2 represents an address range that will be assigned to subchannel 2, and block 3 represents an address range that will be assigned to subchannel 3.

FIG. 7 illustrates another embodiment of identity subchannel assignment for the case of an example 2D tiled address space, again relative to some address A. Note that there are many possible 2D address space tilings, and that higher dimensionality tilings are also possible.

An implementation of identity subchannel assignment may not perform well if request addresses are not uniformly distributed over the subchannels. For example, FIG. 8 illustrates one embodiment of identity subchannel assignment on an exemplary tiled address space such as might be used in graphics applications.

Figure 8:
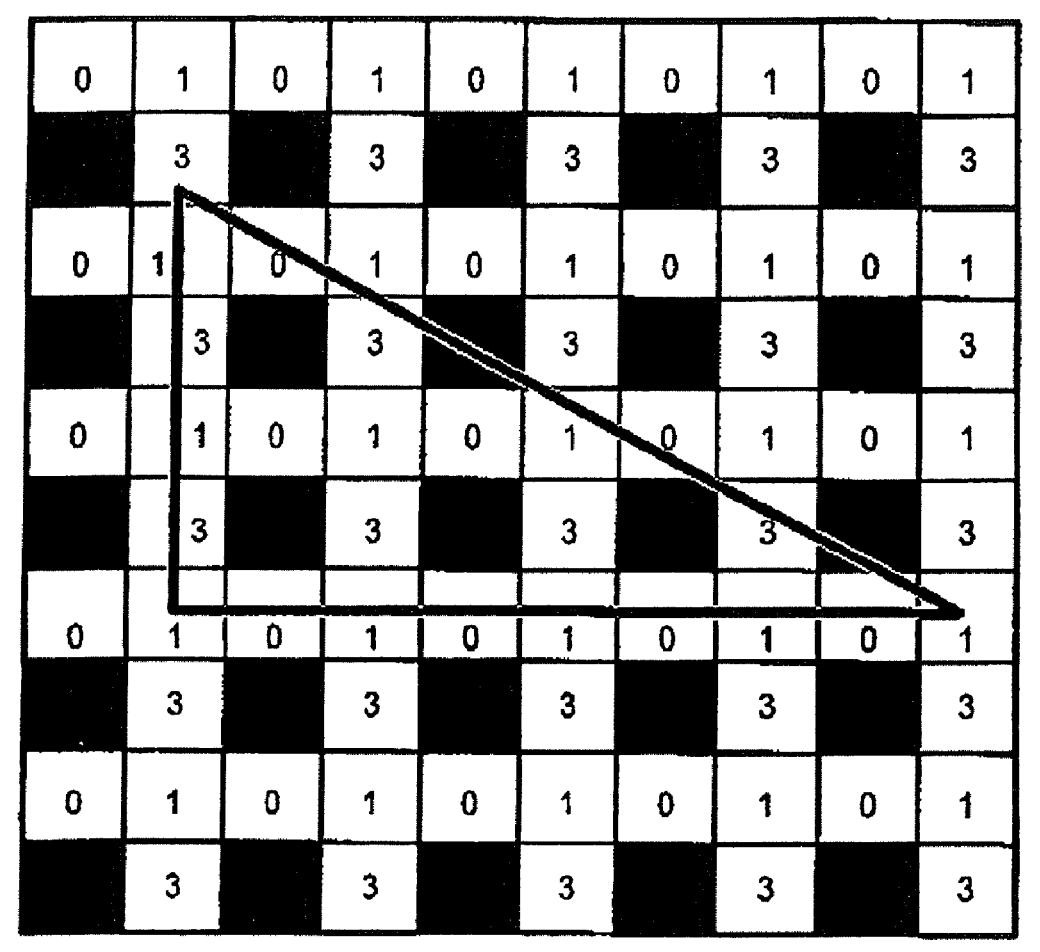

FIG. 8 includes the outline of a triangle to suggest the N byte blocks that are accessed during the rendering of a triangle. Note that requests to access blocks along the left and bottom edges of the triangle are not distributed uniformly among the subchannels. As a result, the transaction assembler 230 might not be able to assemble complete transactions, including requests to all subchannels.

According to one embodiment, non-identity subchannel assignment may be provided to the Micro-Tiling architecture in order to maximize the likelihood that request addresses are uniformly distributed over the subchannels, and, consequently, improve Micro-Tiling BW reduction.

Figure 9:
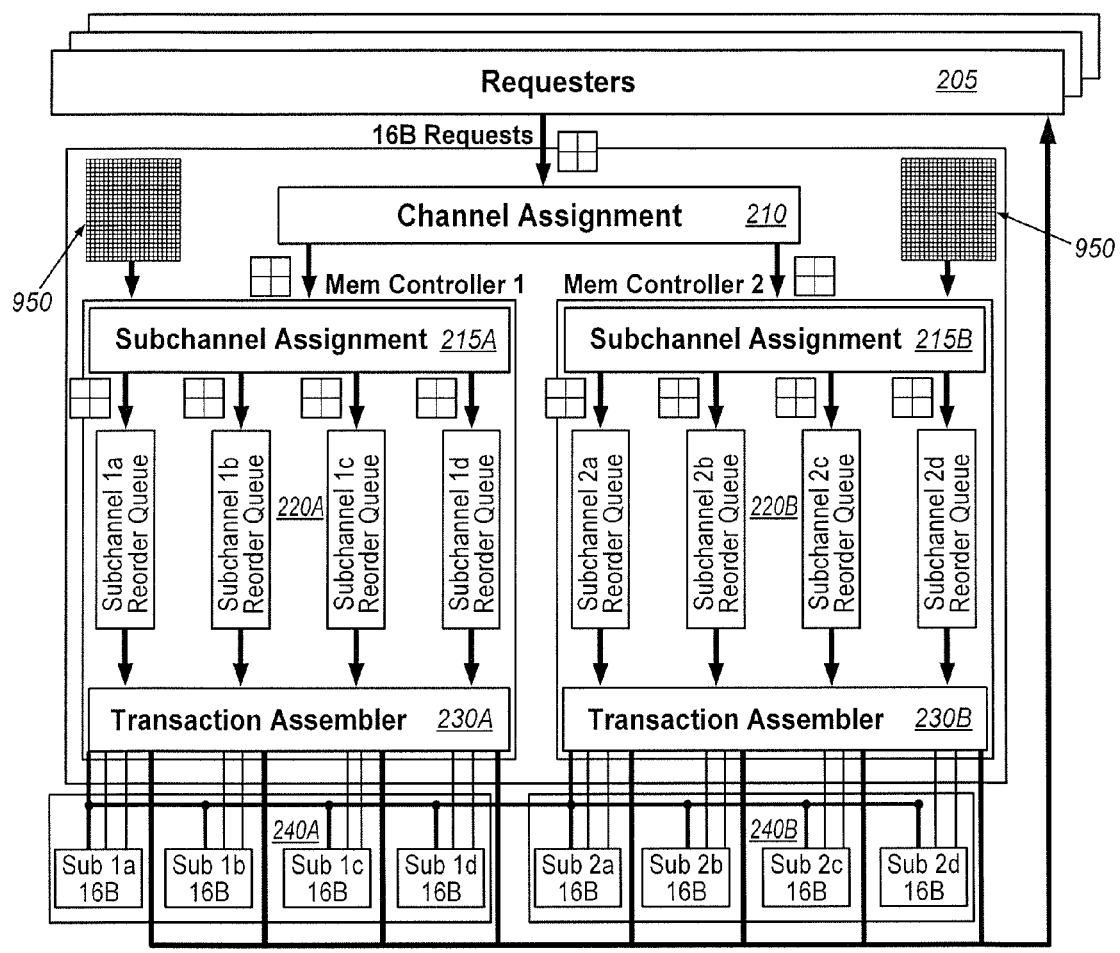
FIG. 9 illustrates another embodiment of a memory controller.

FIG. 9 illustrates another embodiment of a memory controller implementing Micro-Tiling. This embodiment provides mapping logic 950 coupled to subchannel assignment 215 in each memory controller. Similar to above, FIG. 9 shows reorder buffers 220 implemented as a reorder queue for each subchannel. This configuration has two channels, and thus two memory controllers. Each channel includes four subchannels, each 16 bytes wide. Thus each channel may be 64 bytes wide.

In one embodiment, mapping logic 950 transmits an input signal to subchannel assignment 215 indicating how requests are assigned to the subchannels in order to reduce pattern repetition. As a result, the mapping may be changed so that objects are drawn evenly across the subchannels to avoid hot-spotting. In another embodiment, mapping logic 950 provides different mappings to different regions of its address space. The mapping applied to some region of the address space can change over time whenever the data within the region may be no longer of interest.

Figure 10:
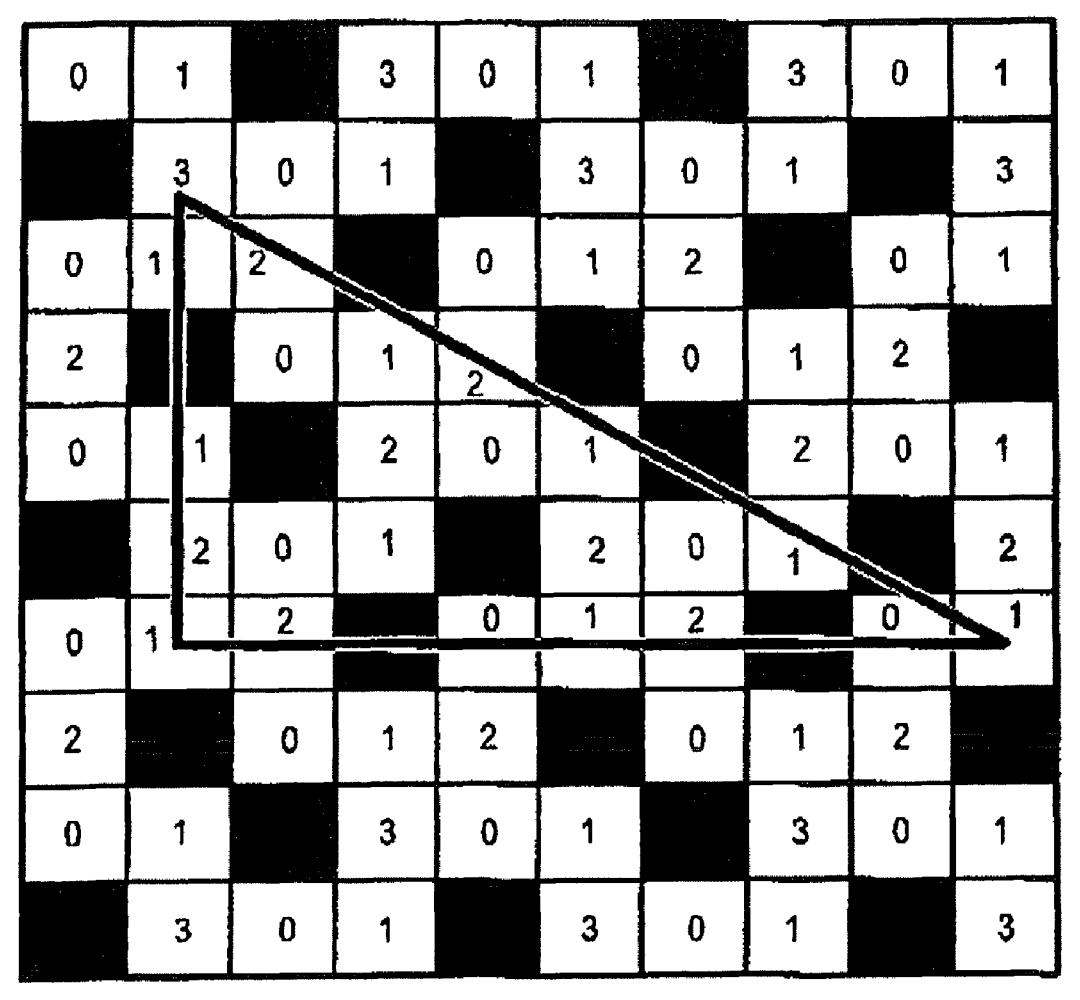

FIG. 10 illustrates one embodiment of non-identity subchannel mapping in which the blocks have the same meaning as described above with respect to FIG. 8. In this case requests to access blocks along the left and bottom edges of the triangle are distributed more uniformly among the subchannels. The effect of this subchannel assignment can be to reduce bandwidth by more efficiently populating Micro-Tiling requests to the memory channel(s). Similarly, in the case of a linear address space, a suitably chosen non-identity subchannel assignment mapping can yield reduced BW particularly where memory accesses typically have a stride that may be a multiple of M bytes.

Figure 11:
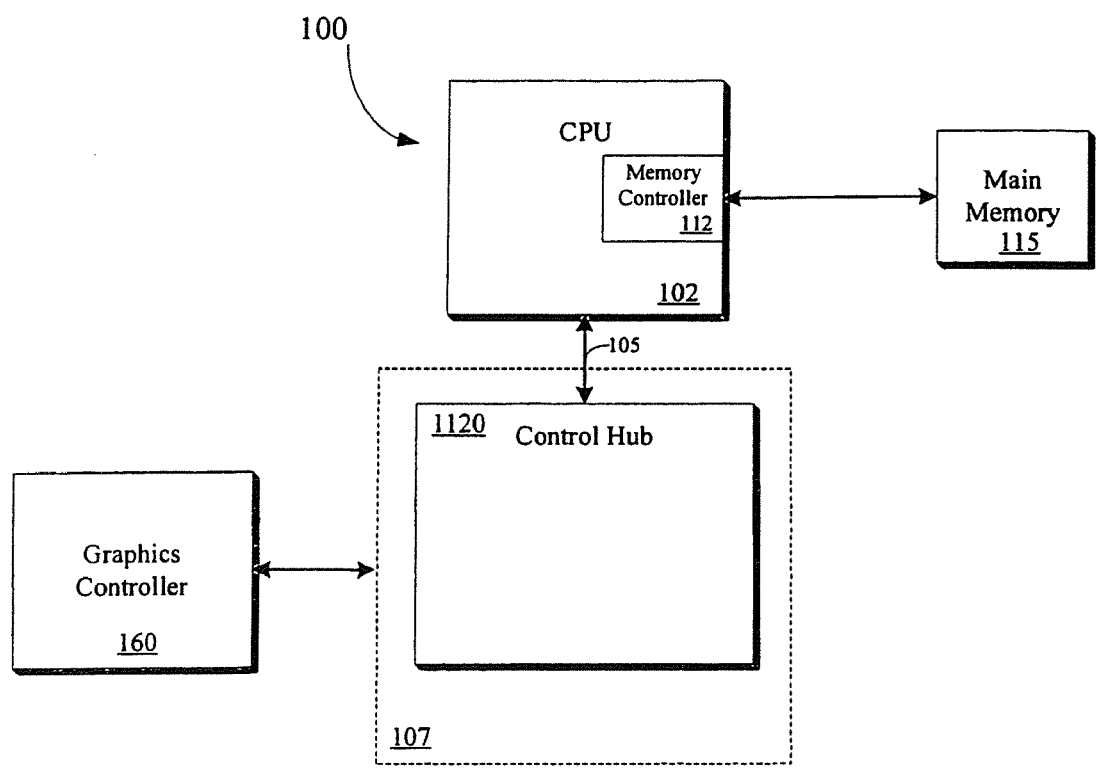
FIG. 11 illustrates another embodiment of a computer system.

FIG. 11 illustrates another embodiment of computer system 100. In this embodiment, chipset 107 includes a single control hub 1120 as opposed to a separate memory control component and I/O control component. Consequently, memory controller 112 may be included within CPU 102, with memory 115 being coupled to CPU 102. In such an embodiment, graphics controller 160 may be coupled to control hub 1120 and accesses main memory 115 via CPU 102

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A memory controller comprising:
   a first control component to break a first channel of a random access memory (RAM) device into first and second independently addressable subchannels, including:
   first assignment logic to receive a first request and a second request to access memory locations in the first channel of the RAM device; and
   a first transaction assembler to construct memory requests by combining the first request with one or more additional requests to access the first independently addressable subchannel within the first-channel and combining the second request with one or more additional requests to access the second independently addressable subchannel within the first channel; and
   a second control component to break a second channel of the RAM device into first and second independently addressable subchannels, including:
   second assignment logic to receive a third request and a fourth request to access memory locations in the second channel of the RAM device; and
   a second transaction assembler to construct memory requests by combining the third request with one or more additional requests to access the second independently addressable subchannel within the second channel and combining the fourth request with one or more additional requests to access the second independently addressable subchannel within the second channel; and
   a memory control component, coupled to the RAM device including a first memory controller including a first micro-tiling component to break a first channel couple into S independently addressable subchannels that are N=M/S bytes wide.

2. The memory controller of claim 1 wherein each of the requests include an independent address component and a shared address component.

3. The memory controller of claim 2 wherein the independent address component of a request is associated with a subchannel.

4. The memory controller of claim 1 wherein the first request includes a first address having different independent address bits from the second request.

5. The memory controller of claim 1 wherein data transferred to each subchannel represents a contiguous block of data.

6. The memory controller of claim 5 wherein the blocks of data at each subchannel is not from a contiguous address range.

7. The memory controller of claim 1 further comprising a reorder buffer to store the subchannel requests.

8. The memory controller of claim 7 wherein the reorder buffer includes a queue associated with each of the subchannels.

9. The memory controller of claim 8 wherein each queue stores subchannel requests to be transferred to an associated subchannel.

10. The memory controller of claim 8 further comprising a transaction assembler to assemble the requests stored in each of the queues and to forward the requests to the associated subchannel.

11. The memory controller of claim 1 further comprising a control line coupled to each of the subchannels, wherein each control line powers down an associate subchannel whenever there is no corresponding request to a channel.

12. A computer system comprising:
a random access memory (RAM) device having one or more M byte wide channels; and
a memory control component, coupled to the RAM device including a first memory controller including a first micro-tiling component to break a first channel couple into S independently addressable subchannels that are N=M/S bytes wide.

13. The computer system of claim 12 further comprising the memory control component including a second memory controller having a second micro-tiling component to break a second channel into S independently addressable subchannels that are N=M/S bytes wide.

14. A system comprising:
a random access memory (RAM) device having one or more channels; and
a chipset, coupled to the RAM device, having:
a first memory controller to break a first channel of the RAM device into first and second independently addressable subchannels, including:
first assignment logic to receive a first request and a second request to access memory locations in the first channel of the RAM device; and
a first transaction assembler to construct memory requests by combining the first request with one or more additional requests to access the first independently addressable subchannel within the first-channel and combining the second request with one or more additional requests to access the second independently addressable subchannel within the first channel; and
a second memory controller to break a second channel of the RAM device into first and second independently addressable subchannels, including:
second assignment logic to receive a third request and a fourth request to access memory locations in the second channel of the RAM device; and
a second transaction assembler to construct memory requests by combining the third request with one or more additional requests to access the second independently addressable subchannel within the second channel and combining the fourth request with one or more additional requests to access the second independently addressable subchannel within the second channel; and
a memory control component, coupled to the RAM device including a first memory controller including a first micro-tiling component to break a first channel couple into S independently addressable subchannels that are N=M/S bytes wide.

15. The system of claim 14 wherein the memory controller further comprises:
a reorder buffer to store the subchannel requests.

16. The system of claim 15 wherein the chipset further comprises a transaction assembler to combine the requests stored in the reorder buffer based upon a shared address and to forward the requests to an associated subchannel.

* * * * *